(12) United States Patent
Murley et al.

(10) Patent No.: US 10,549,667 B1
(45) Date of Patent: Feb. 4, 2020

(54) VEHICLE SEAT WITH HEADREST SUPPORT COVERS

(71) Applicant: Faurecia Automotive Seating, LLC, Auburn Hills, MI (US)

(72) Inventors: Kimberly Murley, Lake Orion, MI (US); Swapnil S. Gathibandhe, Wardha (IN)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/117,269

(22) Filed: Aug. 30, 2018

(51) Int. Cl.
  *B60N 2/865* (2018.01)
  *B60N 2/58* (2006.01)
  *B60N 2/80* (2018.01)

(52) U.S. Cl.
  CPC .............. *B60N 2/865* (2018.02); *B60N 2/58* (2013.01); *B60N 2002/899* (2018.02)

(58) Field of Classification Search
  CPC ..... B60N 2/865; B60N 2/58; B60N 2002/899
  USPC ............. 297/452.38, 406, 408, 410
  See application file for complete search history.

(56) References Cited

U.S. PATENT DOCUMENTS

| | | | | |
|---|---|---|---|---|
| 4,792,183 | A * | 12/1988 | Townsend | B60N 3/004 108/27 |
| 7,070,237 | B2 * | 7/2006 | Rochel | B60R 11/0235 248/118 |
| 7,201,443 | B2 | 4/2007 | Cilluffo | |
| 7,267,407 | B1 * | 9/2007 | Derrick | B60N 2/815 297/410 |
| 7,997,646 | B2 | 8/2011 | Resendez | |
| 9,487,115 | B2 * | 11/2016 | Tachikawa | B60N 2/5825 |

FOREIGN PATENT DOCUMENTS

| | | | |
|---|---|---|---|
| JP | 60058191 A | * | 4/1985 |
| JP | 2014139062 | | 7/2014 |

* cited by examiner

*Primary Examiner* — Milton Nelson, Jr.
(74) *Attorney, Agent, or Firm* — Barnes & Thornburg LLP

(57) ABSTRACT

A vehicle seat for supporting an occupant in the seated position in a vehicle may include a seat module including a base and a backrest projecting upwardly from the base. The vehicle seat further includes a headrest coupled to the backrest. There may be relative movement between the headrest and backrest.

10 Claims, 4 Drawing Sheets

VEHICLE SEAT WITH HEADREST SUPPORT COVERS

BACKGROUND

The present disclosure relates to vehicle seating. More particularly, the present disclosure relates to coverings of vehicle seating.

SUMMARY

According to the present disclosure, a vehicle seat for supporting an occupant in the seated position in a vehicle may include a seat module including a base and a backrest projecting upwardly from the base. The seat module defines a surface for engagement with an occupant. The seat module may include a number of slots defined in a trim portion. The vehicle seat may include a headrest for supporting the occupant's head. The headrest may include a body and a number of stems extending from the body into the seat module through one of the slots to support the headrest above the seat module. One of the backrest and the headrest may be selectively positionable between a forward position and an aft position relative to the other of the backrest and head rest.

In illustrative embodiments, the vehicle seat may include a slot assembly for concealing connection of the headrest with the seat module. The slot assembly may include a number of slot coverings for enclosing the slots of the trim portion. The number of slot coverings may each define a stem hole for receiving one of the stems through the corresponding slot. The slot coverings may each be arranged to enclose the corresponding slot under relative movement between the seat module and head rest.

In illustrative embodiments, the trim portion may be secured with the backrest and may remain stationary relative to the backrest. The stems may move relative to the trim portion during relative movement between backrest and head rest. The stems may maintain corresponding position with the stem holes during movement of the one of the backrest and the headrest between forward and aft positions to enclose the corresponding slot during forward and aftward movement.

In illustrative embodiments, the slot coverings may be arranged inside of the trim portion as an exterior surface element. The slot coverings may be sized and shaped to enclose the corresponding slot throughout the range of movement of the one of the backrest and the headrest between the forward and aft positions. The number of slot coverings may include a resilient material arranged to stretch according to the position of the one of the backrest and the headrest between the forward and aft positions.

In illustrative embodiments, the slot assembly may include a reinforcement secured with the slot covering at each stem hole to support the resilient material. The stem hole of each of the number of slot coverings may be formed complimentary to the respective stem. The slot assembly may include a guidance track arranged to slidingly support the number of slot coverings.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
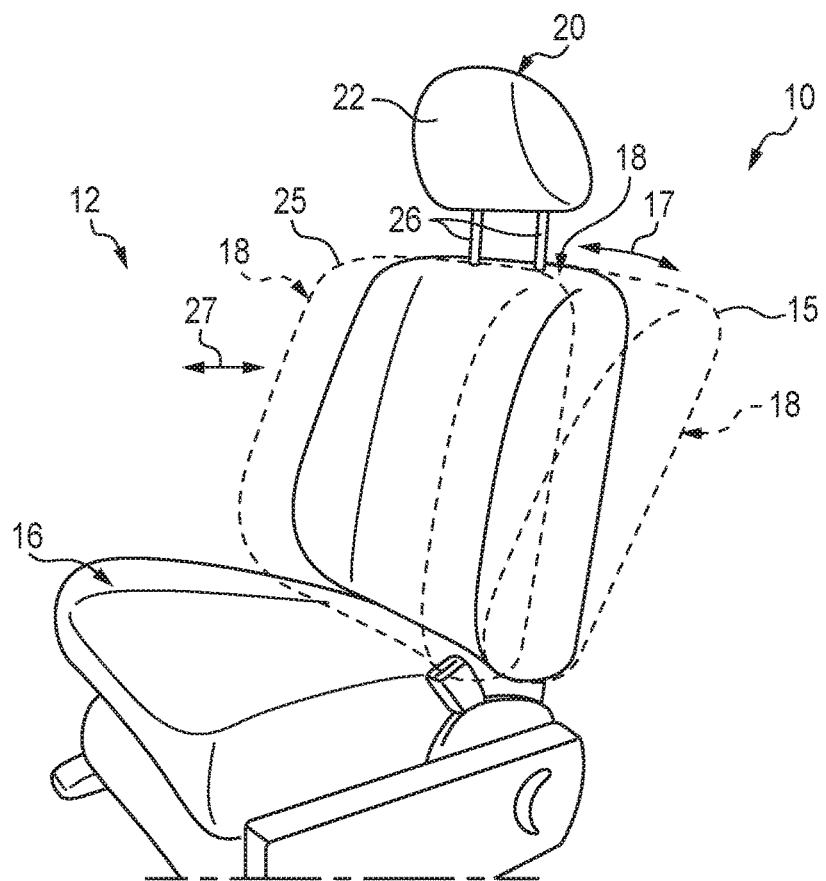
FIG. 1 is a partial perspective view of a vehicle seat in accordance with the present disclosure suggesting movement of a portion of a backrest relative to a headrest.

A vehicle seat 10 is shown for use in a vehicle as shown in FIG. 1. The vehicle seat 10 illustratively includes a seat module 12 including a base 16 for supporting an occupant's seated tail (bottom) and a backrest 18 projecting from the base 16 upwardly to support an occupant's seated torso (back). The backrest 18 may be selectively adjusted in position between forward and aftward positions.

For example, the backrest 18 may be articulated in angle of projection from the base 16 through a range of positions (indicated by arrows 17) between a forward position (solid line) and an aftward position indicated by broken line 15 as desired. By further example, the backrest 18 can be translated through a range of positions (indicated by arrows 27) between an aftward position (solid line) and a forward position (broken line 25). Translation of the backrest 18 illustratively includes translation independent of the base 16, but in some embodiments, can include translation together with the base 16. Although the solid line drawing of the backrest 18 represents both forward and aftward positions depending on the description of articulation or translation, the depictions are not intended to limit the relative range of articulation or translations positions, but merely to illustrate the difference in the articulation and translation movements. The vehicle seat 10 illustratively includes a headrest 20 for supporting the occupant's head.

The headrest 20 is shown illustratively connected with the backrest 18 and extending generally upward for engagement with the seated occupant's head. The headrest 20 includes a receiving face 22 that faces generally forward. The receiving face 22 is arranged for engagement with the seated occupant's head in the event of a sudden change in velocity of the seat 10, such as, during a collision incident of a vehicle in which the vehicle seat 10 is installed. Such sudden changes in velocity are not limited to collisions, but may also include abrupt braking, dramatic turning, and/or elevation changes (bumps). The headrest 20 and consequently the receiving face 22 are illustratively embodied as adjustable in position through an appropriate range of positions, for example but without limitation, through a range of headrest heights and/or range of distances from the occupant's head, to accommodate proper positioning relative to the occupant's head position to enhance safe engagement with the occupant's head. Thus, the headrest 20 can be selectively positioned between forward and aftward positions relative to the backrest 18, and/or the headrest 20 is illustratively arranged to be maintained stationary during movement of the backrest 18 between forward and aftward positions.

Figure 2:
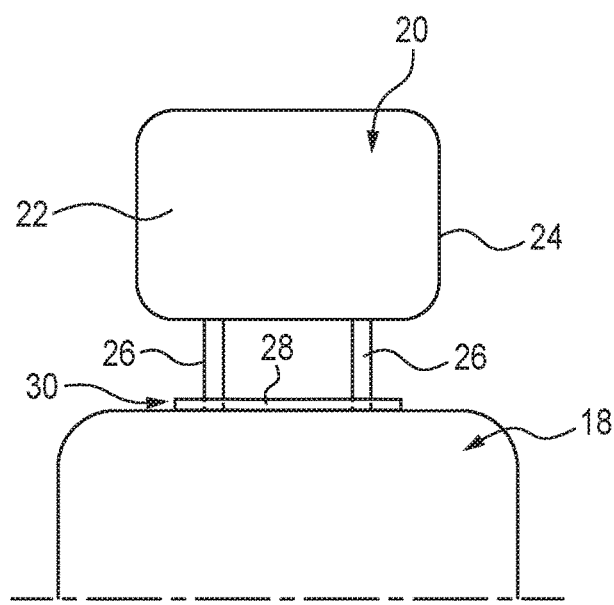
FIG. 2 is a front elevation view of the vehicle seat of FIG. 1 showing the headrest coupled to the backrest and a slot assembly located between them to conceal coupling of the headrest to the backrest.

As shown in FIG. 2, the headrest 20 illustratively includes a body 24 having the face 22 and a pair of stems 26 extending from the body 24 for connection with the seat module 12. The stems 26 illustratively extend downward into the backrest 18 to support the position of the headrest 20 above the seat module 12. A slot assembly 30 assists in concealing the connection of the headrest 20 with the seat module 12. The slot assembly 30 includes a trim section 28 through which the stems 26 extend for connection with the seat module 12.

Figure 3:
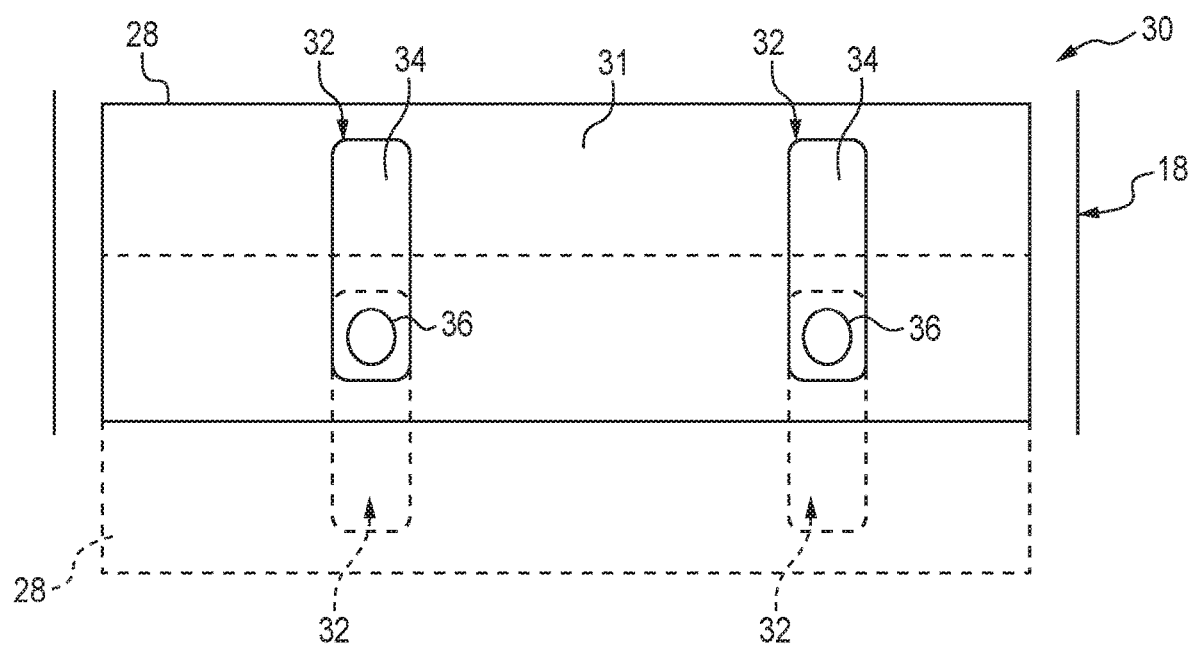
FIG. 3 is a top plan view of the slot assembly of FIG. 2.

The trim section 28 is shown having a top side 31 for facing upward from the backrest 18 as shown in FIG. 3. The trim section 28 is formed to include slots 32 each of which receives one of the stems 26 for connection with the seat module 12. The trim section 28 is illustratively embodied as a portion of the seat module 12 secured with the backrest 18, however, in some embodiments, the trim section 28 may be formed integrally with the seat module 12. The trim section 28 can be equally considered part of the seat module 12 and/or part of the slot assembly 30. The trim section 28 is movable between forward (solid line) and aftward (broken line) positions corresponding to the position of the backrest 18 as shown in FIG. 3.

The slot assembly 30 illustratively includes a covering 34 for enclosing each of the slots 32. The coverings 34 each include a hole 36 for receiving the corresponding stem 26 of the headrest 20 there through into the seat module 12. As the trim section 28 is moved (with the backrest 18) relative to the headrest 20, the stems 26 maintain corresponding position with the holes 36 such that the coverings 34 enclose the slots 32 throughout the range of relative movement between the stems 26 and the trim section 28.

Figure 4:
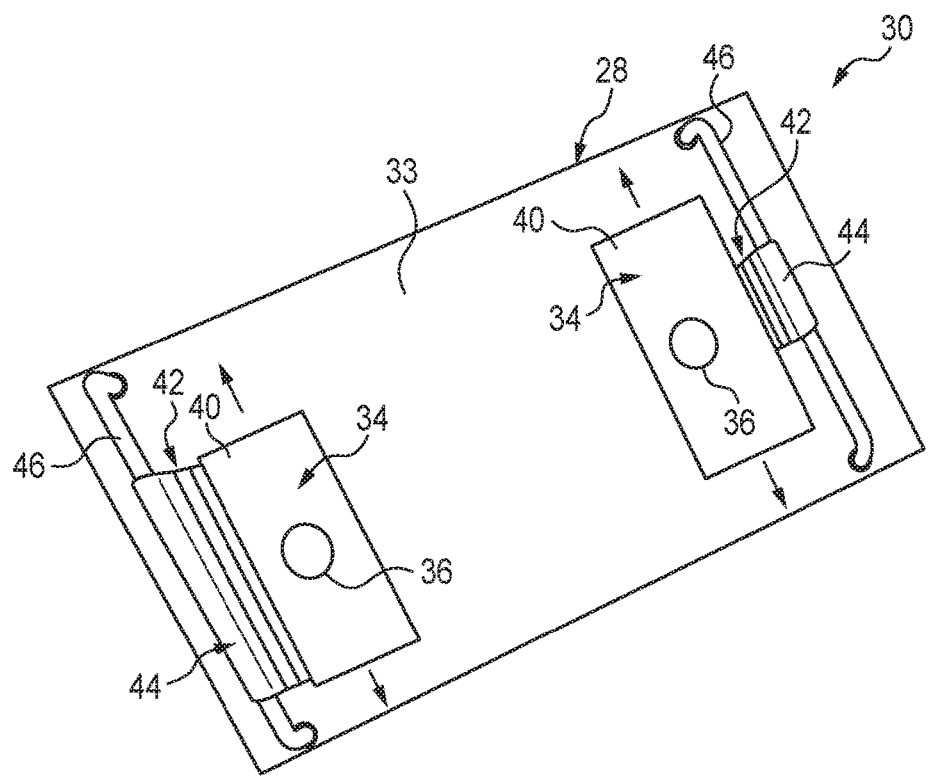
FIG. 4 is a bottom perspective view of the slot assembly of FIGS. 2 and 3.

The trim section 28 includes a bottom side 33 for facing the backrest 18 as shown in FIG. 4. Each covering 34 is illustratively embodied as a section of cloth having the hole 36 defined there through. Each covering 34 is slidingly mounted to the trim section 28 to allow the holes 36 to maintain relative position along with the stems 26 under relative movement between the headrest 20 and the backrest 18.

Each covering 34 is illustratively embodied to include a primary section 40 formed to extend over the corresponding slot 32 throughout the range of movement, and a slide tab 42 extending from the primary section 40. The slide tab 42 illustratively formed a looped section 44 having an axis generally parallel with the direction of movement (i.e., along the forward and backward movement of the backrest 18). The looped section 44 receives a slide bar 46 there through to support the covering 34 while permitting sliding of the bar 46 through the looped section 44 under relative movement of the seat module 12 relative to the stems 26. Accordingly, the coverings 34 enclose the slots 32 during relative movement forward and/or aft movement between the seat module 12 and headrest 20.

The slider bars 46 are each illustratively mounted to the bottom side 33 of the trim section 28, but in some embodiments, may be mounted to the seat module 12 in any suitable location and/or manner to support sliding relative movement of the coverings 34, for example, on the top side 31 and/or to the seat module 12 independent from the trim section 28. The slide tab 44 of the left hand covering 34 in FIG. 4 is illustratively sized larger than the slide tab 44 of the right hand covering 34 to illustrated optional sizes that may be applied to each covering 34, although in some embodiments, and suitable size of slide tab may be applied to permit enclosing the slots 32 throughout the range of relative movement between the seat module 12 and headrest 20.

Figure 5:
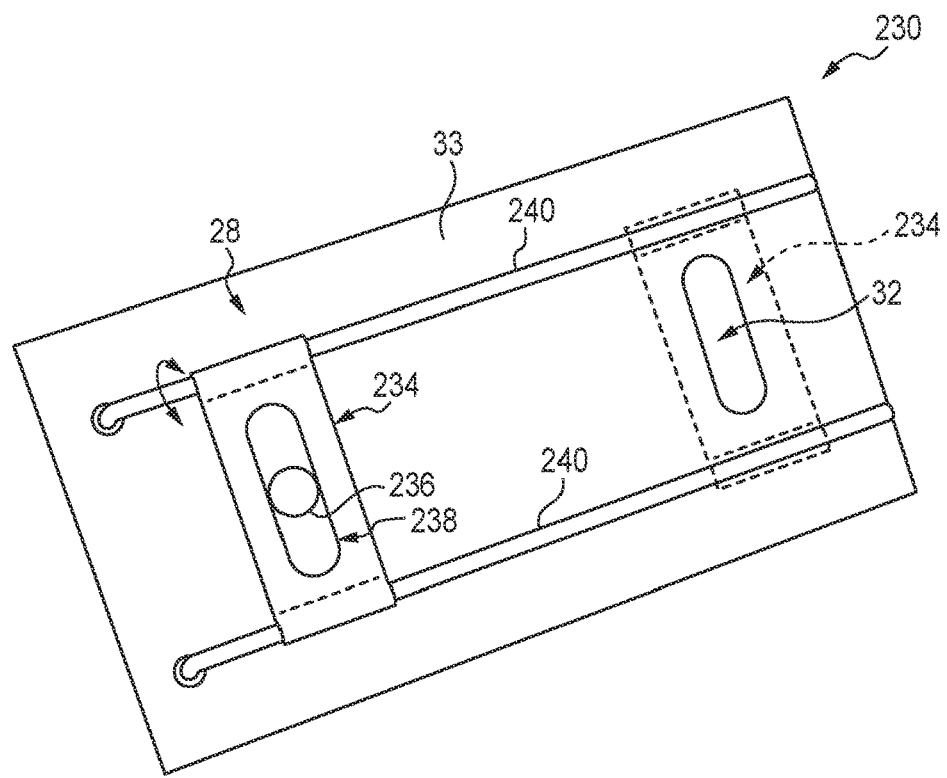
FIG. 5 is a bottom perspective view of another embodiment of a slot assembly in accordance with the present disclosure.
Figure 6:
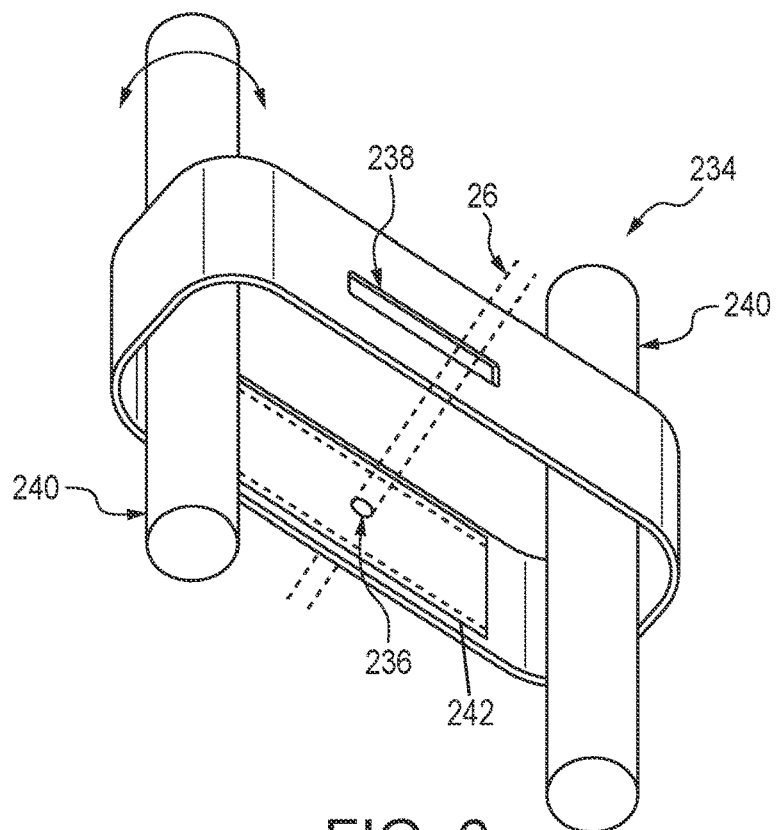
FIG. 6 is a partial perspective view of a portion of the slot assembly of FIG. 5.

Another embodiment of a slot assembly 230 for concealing connection of the headrest 20 with the seat module 12 is shown in FIG. 5. The slot assembly 230 includes coverings 234 for enclosing the slots 32. As best shown in FIG. 6, the coverings 234 are illustratively formed as a caterpillar track (also referred to as a continuous track) allowing tracked sliding to cover the slots 32. In FIG. 5, a right hand covering 234 is shown in broken line to reveal the slot 32 underneath. The coverings 234 track along a pair of bars 240 to maintain coverage of the slots 32 during movement of the backrest 18 relative to the headrest 20.

As shown in FIG. 6, the coverings 234 each include a stem hole 236 and a stem slot 238 disposed on opposite sections of the caterpillar track of each covering 234. A reinforcement member 242 is illustratively formed of polypropylene and secured with the covering 234 to define a portion of the hole 236. Each stem 26 extends through each of the hole 236 and slot 238 of the corresponding covering 234. Under movement of the backrest 18 relative to the headrest 20, the stems 26 maintain corresponding position with the holes 236 while the caterpillar track of each covering 234 slides around the bars 240 to track with the relative movement between the backrest 18 and the headrest 20.

Returning briefly to FIG. 5, the bars 240 are shown as cantilevered from the trim section 28 on the left hand side. The bars 240 define a gap between the trim section 28 to permit sliding of the covering 234. In some embodiments, the bars 240 may be connected with the trim section 28 and/or other portions of the backrest 18 in any suitable manner.

Figure 7:
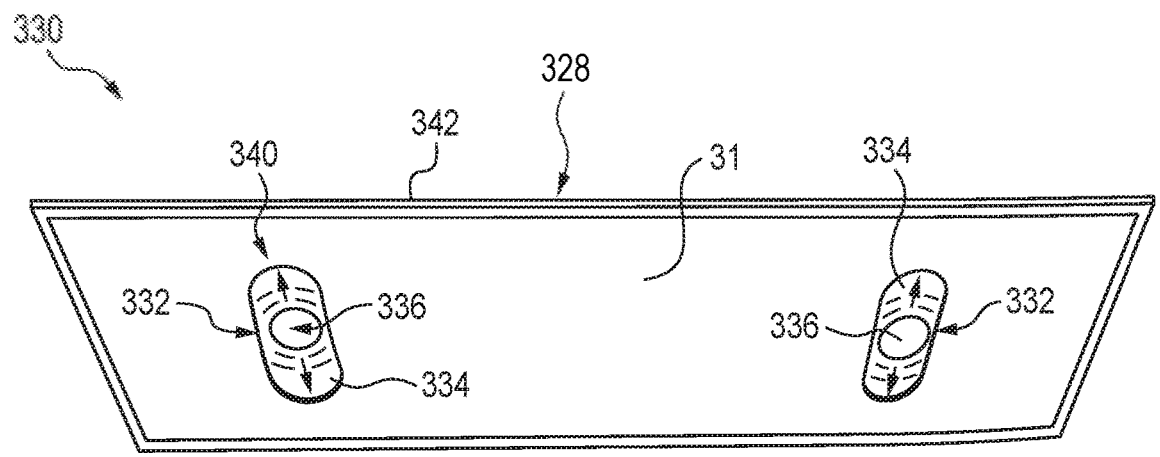
FIG. 7 is a bottom perspective view of another embodiment of a slot assembly in accordance with the present disclosure.

Referring to FIG. 7, another embodiment of a slot assembly 330 is shown including the trim section 28 shown from the topside 31. The trim section 328 defines a pair of slots 332 through which a covering 334 can be seen. The covering 334 is illustratively formed as a resilient sheet of material defining each of the stem holes 336 to receive the stems 26 there through. Under relative movement between the trim section 328 and the stems 26, the covering 334 is elastically stretched to maintain the holes 336 in corresponding position with the stems 26, while maintaining enclosure of the slots 332 throughout the range of movement.

The trim section 328 is illustratively formed of a top sheet 340 and a bottom sheet 342, each having slots 332 formed therein. The covering 334 is arranged between the sheets 340, 342. The covering 334 is illustratively embodied as a single sheet of material secured by stitching along the outer edge with the top and bottom sheets 340, 342, however, in some embodiments, the covering 334 may include two sheets each formed to cover one of the slots 332, and/or more than one layer of sheet.

Figure 8:
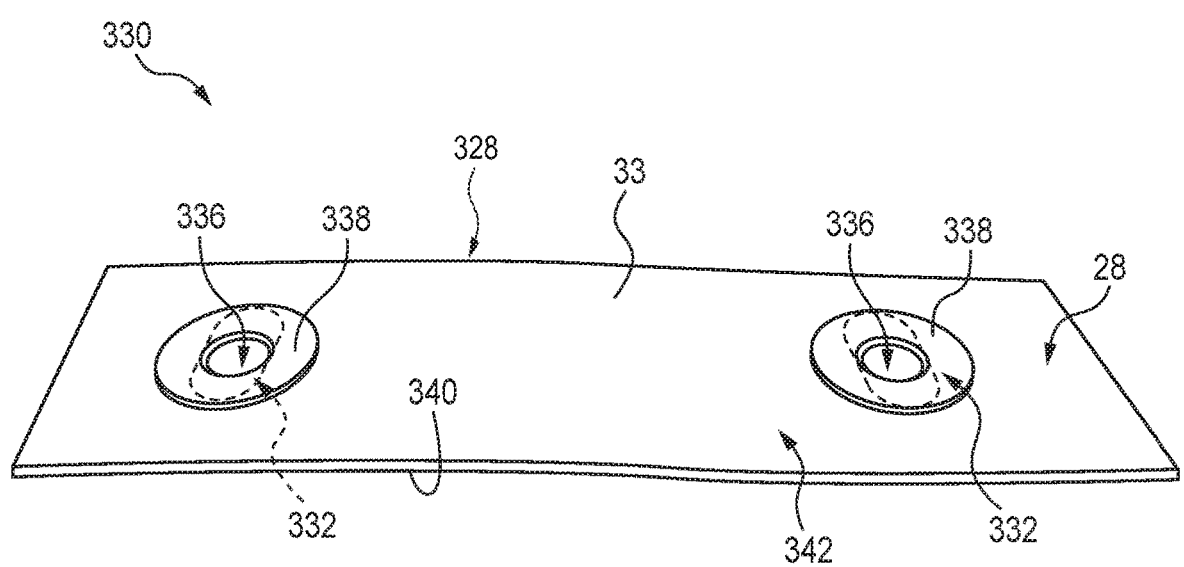
FIG. 8 is a top perspective view of the slot assembly of FIG. 7.

As shown in FIG. 8, the slot assembly 330 includes reinforcement members 338. The reinforcement members 338 are secured with the covering 334 and each define a portion of the stem holes 336 to assist in transferring the relative movement to stretch the covering to maintain enclosure of the slots 332. The reinforcement members 338 are illustratively secured with the covering 334, yet positioned on the inside of the bottom sheet 342 within the backrest 18. In some embodiments, the reinforcement member 338 may be arranged between bottom and top sheets 340, 342 and/or integrally with the covering 334.

The following numbered clauses include embodiments that are contemplated and non-limiting:

Clause 1. A vehicle seat for supporting an occupant in the seated position in a vehicle, the vehicle seat comprising a seat module including a base and a backrest projecting upwardly from the base, the seat module defining a surface for engagement with an occupant, the seat module including a number of slots defined in a trim portion.

Clause 2. The vehicle seat of clause 1, any other clause, or combination of clauses, furthering comprising a headrest for supporting the occupant's head, the headrest including a body and a number of stems extending from the body into the seat module through one of the slots to support the headrest above the seat module.

Clause 3. The vehicle seat of clause 1, any other clause, or combination of clauses, wherein one of the backrest and the headrest is selectively positionable between a forward position and an aft position relative to the other of the backrest and head rest.

Clause 4. The vehicle seat of clause 1, any other clause, or combination of clauses, furthering comprising a slot assembly for concealing connection of the headrest with the seat module.

Clause 5. The vehicle seat of clause 1, any other clause, or combination of clauses, wherein the slot assembly includes a number of slot coverings for enclosing the slots of the trim portion.

Clause 6. The vehicle seat of clause 1, any other clause, or combination of clauses, wherein the number of slot coverings each defining a stem hole for receiving one of the stems through the corresponding slot.

Clause 7. The vehicle seat of clause 1, any other clause, or combination of clauses, wherein the slot coverings are each arranged to enclose the corresponding slot under relative movement between the seat module and head rest.

Clause 8. The vehicle seat of clause 1, any other clause, or combination of clauses, wherein the trim portion is secured with the backrest and remains stationary relative to the backrest.

Clause 9. The vehicle seat of clause 1, any other clause, or combination of clauses, wherein the stems move relative to the trim portion during relative movement between backrest and head rest.

Clause 10. The vehicle seat of clause 1, any other clause, or combination of clauses, wherein the stems maintain corresponding position with the stem holes during movement of the one of the backrest and the headrest between forward and aft positions to enclose the corresponding slot during forward and aftward movement.

Clause 11. The vehicle seat of clause 1, any other clause, or combination of clauses, wherein the slot coverings are arranged inside of the trim portion as an exterior surface element.

Clause 12. The vehicle seat of clause 1, any other clause, or combination of clauses, wherein the slot coverings are sized and shaped to enclose the corresponding slot throughout the range of movement of the one of the backrest and the headrest between the forward and aft positions.

Clause 13. The vehicle seat of clause 1, any other clause, or combination of clauses, wherein the number of slot coverings includes a resilient material arranged to stretch according to the position of the one of the backrest and the headrest between the forward and aft positions.

Clause 14. The vehicle seat of clause 1, any other clause, or combination of clauses, wherein the slot assembly includes a reinforcement secured with the slot coverings at each stem hole to support the resilient material.

Clause 15. The vehicle seat of clause 1, any other clause, or combination of clauses, wherein the stem hole of each of the number of slot coverings is formed complimentary to the respective stem.

Clause 16. The vehicle seat of clause 1, any other clause, or combination of clauses, wherein the slot assembly includes a guidance track arranged to slidingly support the number of slot coverings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle seat for supporting an occupant in a seated position in a vehicle, the vehicle seat comprising
   a seat module including a base and a backrest projecting upwardly from the base, the seat module defining a surface for engagement with an occupant's body, the seat module including a number of slots formed in a trim portion
   a headrest for supporting the occupant's head, the headrest including a body and a number of stems extending from the body into the seat module through one of the slots in the trim portion to support the headrest above the seat module, wherein one of the backrest and the headrest is selectively positionable between a forward position and an aft position relative to the other of the backrest and head rest, and
   a slot assembly for concealing connection of the headrest with the seat module, the slot assembly including a number of slot coverings for enclosing the slots of the trim portion, the number of slot coverings each formed to include a stem hole for receiving one of the stems through the corresponding slot, wherein the slot coverings are each arranged to enclose the corresponding slot under relative movement between the seat module and head rest.

2. The vehicle seat of claim 1, wherein the trim portion is secured with the backrest and remains stationary relative to the backrest.

3. The vehicle seat of claim 2, wherein the stems move relative to the trim portion during relative movement between backrest and head rest.

4. The vehicle seat of claim 3, wherein the stems maintain corresponding position with the stem holes during movement of the one of the backrest and the headrest between forward and aft positions to enclose the corresponding slot during forward and aftward movement.

5. The vehicle seat of claim 1, wherein the slot coverings are arranged inside of the trim portion as an exterior surface element.

6. The vehicle seat of claim 1, wherein the slot coverings are sized and shaped to enclose the corresponding slot throughout the range of movement of the one of the backrest and the headrest between the forward and aft positions.

7. The vehicle seat of claim 1, wherein the number of slot coverings includes a resilient material arranged to stretch according to the position of the one of the backrest and the headrest between the forward and aft positions.

8. The vehicle seat of claim 7, wherein the slot assembly includes a reinforcement secured with each of the number of slot coverings at each stem hole to support the resilient material.

9. The vehicle seat of claim 1, wherein the stem hole of each of the number of slot coverings is formed complimentary to the respective stem.

10. The vehicle seat of claim 1, wherein the slot assembly includes a guidance track arranged to slidingly support the number of slot coverings.

\* \* \* \* \*